(12) United States Patent
Kikuchi et al.

(10) Patent No.: US 8,119,721 B2
(45) Date of Patent: Feb. 21, 2012

(54) TREAD RUBBER COMPOSITION FOR STUDLESS TIRE AND STUDLESS TIRE

(75) Inventors: Naohiko Kikuchi, Kobe (JP); Ryoji Kojima, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 143 days.

(21) Appl. No.: 12/537,604

(22) Filed: Aug. 7, 2009

(65) Prior Publication Data

US 2010/0144954 A1   Jun. 10, 2010

(30) Foreign Application Priority Data

Dec. 10, 2008   (JP) ................................ 2008-314738

(51) Int. Cl.
*C08K 5/544* (2006.01)
*C08K 3/04* (2006.01)

(52) U.S. Cl. ........ 524/492; 524/495; 524/572; 525/342; 525/374

(58) Field of Classification Search .................. 525/342, 525/374; 524/492, 495, 572
See application file for complete search history.

(56) References Cited

U.S. PATENT DOCUMENTS

| 6,294,624 | B1 | 9/2001 | Inoue et al. | |
| 7,202,306 | B2 * | 4/2007 | Tanaka et al. | 525/331.9 |
| 2009/0308513 | A1 | 12/2009 | Ota | |

FOREIGN PATENT DOCUMENTS

| DE | 10015308 A1 | 10/2001 |
| EP | 0341496 A2 | 11/1989 |
| EP | 1022291 A1 | 7/2000 |
| EP | 1297974 A1 | 4/2003 |
| EP | 1958984 A1 | 8/2008 |
| JP | EP 0 341 496 * | 11/1989 |
| JP | 6-240052 A | 8/1994 |
| JP | 2000-159814 A | 6/2000 |
| JP | EP 1 022 291 A1 * | 7/2000 |
| JP | 2000-344954 A | 12/2000 |
| JP | 2000-344955 A | 12/2000 |
| JP | 2001-40001 A | 2/2001 |
| JP | 2007-31722 A | 2/2007 |
| JP | EP 1 958 984 A1 * | 8/2008 |
| WO | WO 2008/004675 A1 | 1/2008 |

OTHER PUBLICATIONS

Office Action for corresponding Japanese Application No. 2008-314738 dated May 17, 2011.

* cited by examiner

*Primary Examiner* — Ling-Siu Choi
(74) *Attorney, Agent, or Firm* — Birch, Stewart, Kolasch & Birch, LLP

(57) ABSTRACT

The present invention provides a tread rubber composition for a studless tire having favorable performance on ice and snow and excellent abrasion resistance while reducing strain dependence of hardness of the tread rubber and maintaining rigidity on roads that are not covered with snow and relates to a tread rubber composition for a studless tire, which comprises a diene rubber containing, in a total amount of 80% by mass or more, natural rubber and polybutadiene rubber; silica in an amount of 10 to 150 parts by mass per 100 parts by mass of the diene rubber; and carbon black in an amount of 3 to 50 parts by mass per 100 parts by mass of the diene rubber, wherein the diene rubber contains 10% by mass or more of a polybutadiene rubber modified by a compound represented by the formula (I):

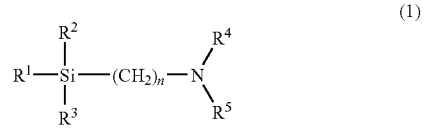

(1)

$R^1$, $R^2$ and $R^3$ being independently an alkyl group, an alkoxy group, a silyloxy group, an acetal group, a carboxyl group, a mercapto group, or a derivative thereof; $R^4$ and $R^5$ being independently a hydrogen atom or an alkyl group; and n being an integer.

5 Claims, No Drawings

TREAD RUBBER COMPOSITION FOR STUDLESS TIRE AND STUDLESS TIRE

TECHNICAL FIELD

The present invention relates to a tread rubber composition for a studless tire (a winter tire), and a studless tire produced using the same.

BACKGROUND ART

Vehicles have been equipped with spike tires or with tire chains for driving ice roads and snow-covered roads. This, however, causes environmental problems such as dust pollution, and studless tires have been developed as the replacement for the spike tires and the tire chains for driving ice roads and snow-covered roads. The studless tires have been improved in their materials and designs for driving snow-covered roads whose surface is rougher than that of usual roads. Specifically, there have been developed rubber compositions which contain diene rubbers having excellent low-temperature properties. Recently, however, the studless tires have been required to achieve further improvement of performance on ice and snow, as well as improvement of abrasion resistance.

Patent Documents 1 to 3 disclose that the following rubbers can improve performance on ice and snow and other performances, and are useful as rubber materials for tire treads. Patent Document 1 discloses a polybutadiene modified by an organoalkoxysilane or the like. Patent Document 2 discloses a polybutadiene modified by a diamine compound. Patent Document 3 discloses a diene rubber modified by a silicon compound having an amino group and an alkoxy group. Patent Documents 4 and 5 disclose that it is possible to improve performance on ice and snow and other performances by blending silica into a diene rubber modified by a silicon compound having an amino group and an alkoxy group, and the rubber compositions thereby produced are useful for tire treads.

However, the studless tires can be further improved in performance on ice and snow and abrasion resistance while reducing strain dependence of hardness of the tread rubbers for the studless tires and maintaining rigidity on roads that are not covered with snow.

Patent Document 1: JP 2001-40001 A
Patent Document 2: JP 2007-31722 A
Patent Document 3: JP 2000-159814 A
Patent Document 4: JP 2000-344954 A
Patent Document 5: JP 2000-344955 A

SUMMARY OF THE INVENTION

The present invention has its object to provide a tread rubber composition for a studless tire, which can solve the above problems and which has favorable performance on ice and snow and excellent abrasion resistance while reducing strain dependence of hardness of the tread rubber and maintaining rigidity on roads that are not covered with snow. The present invention also has its object to provide a studless tire which comprises a tread produced using the above rubber composition.

The present invention relates to a tread rubber composition for a studless tire, which comprises: a diene rubber containing, in a total amount of 80% by mass or more, natural rubber and polybutadiene rubber; silica in an amount of 10 to 150 parts by mass per 100 parts by mass of the diene rubber; and carbon black in an amount of 3 to 50 parts by mass per 100 parts by mass of the diene rubber. The diene rubber contains 10% by mass or more of a polybutadiene rubber modified by a compound represented by the formula (1).

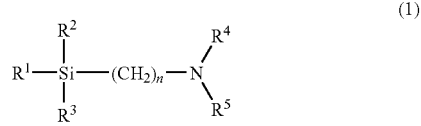

In the formula (1), $R^1$, $R^2$ and $R^3$ are the same or different and are independently an alkyl group, an alkoxy group, a silyloxy group, an acetal group, a carboxyl group, a mercapto group, or a derivative thereof; $R^4$ and $R^5$ are the same or different and are independently a hydrogen atom or an alkyl group; and n is an integer.

The tread rubber composition for a studless tire desirably has a tan δ peak temperature (Tg) of −40° C. or lower and a hardness at 0° C. of 64 or lower.

The amount of the natural rubber in the diene rubber is desirably 35 to 80% by mass.

The vinyl content in the modified polybutadiene rubber is desirably 35% by mass or less.

The present invention also relates to a studless tire which comprises a tread produced using the tread rubber composition.

According to one aspect of the present invention, the tread rubber composition of the present invention comprises: a diene rubber containing, in a total amount of 80% by mass or more, natural rubber and polybutadiene rubber; silica; and carbon black, each in a predetermined amount, and the diene rubber (i.e. the polybutadiene rubber) contains a predetermined amount of a polybutadiene rubber that is modified by a specific compound. Thus, in the case where a tread of a studless tire is produced using the rubber composition of the present invention, it is possible to provide a studless tire which achieves favorable performance on ice and snow and excellent abrasion resistance while reducing strain dependence of hardness of the tread rubber and maintaining rigidity on roads that are not covered with snow.

BEST MODE FOR CARRYING OUT THE INVENTION

The tread rubber composition for a studless tire of the present invention comprises: a diene rubber containing, in a total amount of 80% by mass or more, natural rubber and polybutadiene rubber; silica; and carbon black, each in a predetermined amount. The tread rubber composition contains a predetermined amount of a polybutadiene rubber modified by a compound represented by the formula (1) (also referred to as a modified polybutadiene rubber) as one component of the diene rubber (i.e. as one component of the polybutadiene rubber).

The total amount of natural rubber and polybutadiene rubber in 100% by mass of the diene rubber is 80% by mass or more, desirably 85% by mass or more, and more desirably 90% by mass or more. If the total amount thereof is less than 80% by mass, abrasion resistance tends to decrease.

The term "polybutadiene" used herein includes, as an example, a modified polybutadiene rubber described hereinbelow.

The diene rubber desirably contains natural rubber from the viewpoint of the texture of kneaded rubber such as the capability of coming together. The amount of the natural rubber in 100% by mass of the diene rubber is desirably 35% by mass or more, and more desirably 40% by mass or more. The upper limit of the amount of the natural rubber in 100% by mass of the diene rubber is not particularly restricted, and is desirably 80% by mass or less, more desirably 75% by mass or less, and still more desirably 70% by mass or less. If the amount of the natural rubber is more than 80% by mass, abrasion resistance tends to decrease.

The natural rubber is not particularly limited. For example, natural rubbers generally used in the tire industry can be used, such as SIR20, RSS#3 and TSR20.

The polybutadiene rubber (BR) is not particularly limited. Examples thereof include: BRs with a high cis-content such as BR1220 (produced by ZEON Corp.), BR130B and BR150B (each produced by UBE INDUSTRIES, LTD.); and syndiotactic polybutadiene crystal-containing BRs such as VCR412 and VCR617 (each produced by UBE INDUSTRIES, LTD.).

In the rubber composition of the present invention, which comprises a diene rubber mainly containing NR and BR, silica, and carbon black, a polybutadiene rubber modified by a compound represented by the formula (1) is blended as one component of the BR in the diene rubber. Thereby, both performance on ice and snow and abrasion resistance can be improved, and rigidity can be also maintained.

In the compound represented by the formula (1), $R^1$, $R^2$ and $R^3$ are the same or different and are independently an alkyl group, an alkoxy group, a silyloxy group, an acetal group, a carboxyl group (—COOH), a mercapto group (—SH), or a derivative thereof.

Examples of the alkyl group include $C_{1-4}$ alkyl groups such as a methyl group, an ethyl group, an n-propyl group, an isopropyl group, an n-butyl group, and a t-butyl group.

Examples of the alkoxy group include $C_{1-8}$ (desirably $C_{1-6}$, and more desirably $C_{1-4}$) alkoxy groups such as a methoxy group, an ethoxy group, an n-propoxy group, an isopropoxy group, an n-butoxy group, and a t-butoxy group. The alkoxy group also includes cycloalkoxy groups ($C_{5-8}$ cycloalkoxy groups such as a cyclohexyloxy group), and aryloxy groups ($C_{6-8}$ aryloxy groups such as a phenoxy group and a benzyloxy group).

Examples of the silyloxy group include silyloxy groups with substitution by a $C_{1-20}$ aliphatic group or aromatic group (such as a trimethylsilyloxy group, a triethylsilyloxy group, a triisopropylsilyloxy group, a diethylisopropylsilyloxy group, a t-butyldimethylsilyloxy group, a t-butyldiphenylsilyloxy group, a tribenzylsilyloxy group, a triphenylsilyloxy group, and a tri-p-xylylsilyloxy group).

Examples of the acetal group include groups represented by the formula of —C(RR')—OR" or —O—C(RR')—OR".

Examples of the groups represented by the former formula include a methoxymethyl group, an ethoxymethyl group, a propoxymethyl group, a butoxymethyl group, an isopropoxymethyl group, a t-butoxymethyl group, and a neopentyloxymethyl group.

Examples of the groups represented by the latter formula include a methoxymethoxy group, an ethoxymethoxy group, a propoxymethoxy group, an i-propoxymethoxy group, an n-butoxymethoxy group, a t-butoxymethoxy group, an n-pentyloxymethoxy group, an n-hexyloxymethoxy group, a cyclopentyloxymethoxy group, and a cyclohexyloxymethoxy group.

Each of $R^1$, $R^2$ and $R^3$ is desirably an alkoxy group, and particularly desirably a methoxy group or an ethoxy group, from the viewpoints of improvements in performance on ice and snow and abrasion resistance.

With respect to the alkyl groups at $R^4$ and $R^5$, the same alkyl groups as those mentioned above can be exemplified. Each of $R^4$ and $R^5$ is desirably an alkyl group, and more desirably a methyl group or an ethyl group, from the viewpoints of improvements in performance on ice and snow and abrasion resistance.

The n (integer) is desirably 1 to 5, more desirably 2 to 4, and most desirably 3. If the n is 0, a difficulty may be caused in bonding between a silicon atom and a nitrogen atom. If the n is 6 or more, the efficacy of the compound as a modifying agent may weaken.

Specific examples of the compound represented by the formula (1) include: 3-aminopropyldimethylmethoxysilane, 3-aminopropylmethyldimethoxysilane, 3-aminopropylethyldimethoxysilane, 3-aminopropyltrimethoxysilane, 3-aminopropyldimethylethoxysilane, 3-aminopropylmethyldiethoxysilane, 3-aminopropyltriethoxysilane, 3-aminopropyldimethylbutoxysilane, 3-aminopropylmethyldibutoxysilane, dimethylaminomethyltrimethoxysilane, 2-dimethylaminoethyltrimethoxysilane, 3-dimethylaminopropyltrimethoxysilane, 4-dimethylaminobutyltrimethoxysilane, dimethylaminomethyldimethoxymethylsilane, 2-dimethylaminoethyldimethoxymethylsilane, 3-dimethylaminopropyldimethoxymethylsilane, 4-dimethylaminobutyldimethoxymethylsilane, dimethylaminomethyltriethoxysilane, 2-dimethylaminoethyltriethoxysilane, 3-dimethylaminopropyltriethoxysilane, 4-dimethylaminobutyltriethoxysilane, dimethylaminomethyldiethoxymethylsilane, 2-dimethylaminoethyldiethoxymethylsilane, 3-dimethylaminopropyldiethoxymethylsilane, 4-dimethylaminobutyldiethoxymethylsilane, diethylaminomethyltrimethoxysilane, 2-diethylaminoethyltrimethoxysilane, 3-diethylaminopropyltrimethoxysilane, 4-diethylaminobutyltrimethoxysilane, diethylaminomethyldimethoxymethylsilane, 2-diethylaminoethyldimethoxymethylsilane, 3-diethylaminopropyldimethoxymethylsilane, 4-diethylaminobutyldimethoxymethylsilane, diethylaminomethyltriethoxysilane, 2-diethylaminoethyltriethoxysilane, 3-diethylaminopropyltriethoxysilane, 4-diethylaminobutyltriethoxysilane, diethylaminomethyldiethoxymethylsilane, 2-diethylaminoethyldiethoxymethylsilane, 3-diethylaminopropyldiethoxymethylsilane, and 4-diethylaminobutyldiethoxymethylsilane. Particularly, diethylaminopropyltrimethoxysilane is suitably used from the viewpoints of improvements in performance on ice and snow and abrasion resistance. Each of these may be used singly, or two or more of these may be used in combination.

With respect to a method for modifying polybutadiene rubber by the compound (modifying agent) represented by the formula (1), conventionally known methods such as methods disclosed in, for example, JP H06-53768 B and JP H06-57767 B may be used. What is required for the modification method is, for example, to allow polybutadiene rubber to contact a modifying agent; there may be mentioned, for instance, a method in which polybutadiene rubber is polymerized and a modifying agent is added in a predetermined amount into the polymerized rubber solution, a method in which a modifying agent is added into a polybutadiene rubber solution to react with each other, and like methods.

The polybutadiene rubber (BR) to be modified is not particularly limited, and the BRs listed above can be used, for instance.

The vinyl content in the modified polybutadiene rubber is desirably 35% by mass or less, more desirably 25% by mass or less, and still more desirably 20% by mass or less. If the vinyl content is more than 35% by mass, strain dependence of hardness of the tread rubber obtained tends not to be sufficiently reduced. The lower limit of the vinyl content is not particularly restricted.

The vinyl content (the content of 1,2-bond butadiene unit) can be measured by an infrared absorption spectrum analysis.

The amount of the modified polybutadiene rubber used as the BR component in the diene rubber is desirably 10% by mass or more, and more desirably 15% by mass or more, per 100% by mass of the diene rubber. If the amount thereof is less than 10% by mass, strain dependence of hardness of the tread rubber obtained is not expected to be sufficiently reduced. The upper limit of the amount of the modified polybutadiene rubber is not particularly restricted, and is desirably 90% by mass or less, more desirably 80% by mass or less, still more desirably 60% by mass or less, and particularly desirably 50% by mass or less. If the amount thereof is more than 90% by mass, rubber strength tends to be insufficient.

With respect to other diene rubbers that can be used, except the NR and the BR such as the modified polybutadiene rubber, examples thereof include epoxidized natural rubbers (ENRs), styrene-butadiene rubber (SBR), isoprene rubber (IR), ethylene-propylene-diene rubber (EPDM), butyl rubber (IIR), halogenated butyl rubbers (X-IIRs), chloroprene rubber (CR), acrylonitrile-butadiene rubber (NBR), and halogenated copolymers of an isomonoolefin and a paraalkylstyrene.

The tread rubber composition of the present invention contains silica. Containing silica and the modified polybutadiene rubber together makes it possible to improve performance on ice and snow and abrasion resistance. The silica is not particularly limited. Examples thereof include dry silica (silicic anhydride) and wet silica (hydrous silicic acid). The wet silica is desirable because it has more silanol groups.

The average primary particle size of the silica is desirably 10 nm or more, and more desirably 15 nm or more. If the average primary particle size thereof is less than 10 nm, the silica easily agglomerates and thereby tends not to be sufficiently dispersed. The average primary particle size of the silica is desirably 40 nm or less, and more desirably 30 nm or less. If the average primary particle size thereof is more than 40 nm, its rubber-reinforcing property tends to be poor and abrasion resistance tends to decrease.

The average primary particle size of silica can be determined, for example, as follows: observing silica with an electron microscope; measuring particle sizes of any 50 particles thereof; and averaging the particle sizes.

The nitrogen adsorption specific surface area ($N_2SA$) of the silica is desirably 120 $m^2/g$ or more, and more desirably 150 $m^2/g$ or more. If the $N_2SA$ is less than 120 $m^2/g$, its rubber-reinforcing property tends to be poor and abrasion resistance tends to decrease. The $N_2SA$ of the silica is desirably 220 $m^2/g$ or less, and more desirably 200 $m^2/g$ or less. If the $N_2SA$ is more than 220 $m^2/g$, the silica easily agglomerates and thereby tends not to be sufficiently dispersed.

The amount of the silica is 10 parts by mass or more, and desirably 20 parts by mass or more, per 100 parts by mass of the diene rubber. If the amount of the silica is less than 10 parts by mass, effects of blending silica cannot be sufficiently exerted. The amount of the silica is 150 parts by mass or less, desirably 120 parts by mass or less, and more desirably 80 parts by mass or less, per 100 parts by mass of the diene rubber. If the amount of the silica is more than 150 parts by mass, it will be difficult to disperse the silica in a rubber composition, which results in poor rubber proccessability.

The tread rubber composition of the present invention desirably contains a silane coupling agent. Any silane coupling agents conventionally used in combination with silica in the rubber industry can be used. Examples thereof include: sulfide-type silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropylmethacrylate monosulfide, and 3-trimethoxysilylpropylmethacrylate monosulfide; mercapto-type silane coupling agents such as 3-mercaptopropyl trimethoxysilane, 3-mercaptopropyl triethoxysilane, 2-mercaptoethyl trimethoxysilane, and 2-mercaptoethyl triethoxysilane; vinyl-type silane coupling agents such as vinyltriethoxysilane and vinyltrimethoxysilane; amino-type silane coupling agents such as 3-aminopropyl triethoxysilane, 3-aminopropyl trimethoxysilane, 3-(2-aminoethyl)aminopropyl triethoxysilane, and 3-(2-aminoethyl)aminopropyl trimethoxysilane; glycidoxy-type silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro-type silane coupling agents such as 3-nitropropyl trimethoxysilane and 3-nitropropyl triethoxysilane; and chloro-type silane coupling agents such as 3-chloropropyl trimethoxysilane, 3-chloropropyl triethoxysilane, 2-chloroethyl trimethoxysilane, and 2-chloroethyl triethoxysilane. As the trade name thereof, Si69, Si75, and Si363 (each produced by Degussa AG), NXT, NXT-LV, NXT-ULV, and NXT-Z (each produced by MOMENTIVE), and the like are listed. Desirable among these are bis(3-triethoxysilylpropyl)disulfide and bis(3-triethoxysilylpropyl)tetrasulfide. Each of these silane coupling agents may be used singly or two or more of these may be used in combination.

The amount of the silane coupling agent is desirably 5 parts by mass or more, and more desirably 8 parts by mass or more, per 100 parts by mass of the silica. If the amount thereof is less than 5 parts by mass, breaking strength tends to be significantly reduced. The amount of the silane coupling agent is desirably 15 parts by mass or less, and more desirably 10 parts by mass or less, per 100 parts by mass of the silica. If the amount thereof is more than 15 parts by mass, effects of adding a silane coupling agent, such as increase in breaking strength and decrease in strain dependence of hardness of a tread rubber, tend not to be exerted.

Examples of the carbon black to be used include GPF, HAF, ISAF and SAF. Containing carbon black makes it possible to enhance rubber strength, and combined use of carbon black with the diene rubber such as the modified BR and the NR and silica makes it possible to improve abrasion resistance and performance on ice and snow.

In the case of using carbon black, the nitrogen adsorption specific surface area ($N_2SA$) of the carbon black is desirably 50 $m^2/g$ or more, and more desirably 70 $m^2/g$ or more. If the $N_2SA$ is less than 50 $m^2/g$, a reinforcing property provided by carbon black tends to be insufficient. The $N_2SA$ of the carbon black is desirably 140 $m^2/g$ or less, and more desirably 110 $m^2/g$ or less. If the $N_2SA$ is more than 140 $m^2/g$, viscosity before vulcanization may be very high, and thereby proccessability tends to deteriorate or fuel consumption tends to increase. The nitrogen adsorption specific surface area of the carbon black is determined by the method A in JIS K 6217.

The amount of the carbon black is 3 parts by mass or more, and desirably 5 parts by mass or more, per 100 parts by mass of the diene rubber. If the amount thereof is less than 3 parts by mass, a reinforcing property provided by the carbon black tends to be insufficient. The amount of the carbon black is 50 parts by mass or less, desirably 40 parts by mass or less, and more desirably 30 parts by mass or less, per 100 parts by mass of the diene rubber. If the amount is more than 50 parts by mass, much heat tends to be generated.

In addition to the above listed ingredients, the tread rubber composition of the present invention may optionally contain compounding ingredients commonly used in production of rubber compositions. Examples of the compounding ingredients include: reinforcing fillers such as clay; zinc oxide; stearic acid; various antioxidants; oils such as aromatic oils; waxes; vulcanizing agents; and vulcanization accelerators.

Examples of the vulcanization accelerator which can be used according to the present invention include N-tert-butyl-2-benzothiazolylsulfenamide (TBBS), N-cyclohexyl-2-benzothiazolylsulfenamide (CBS), N,N'-dicyclohexyl-2-benzothiazolylsulfenamide (DZ), mercaptobenzothiazol (MBT), dibenzothiazolyldisulfide (MBTS), and diphenylguanidine (DPG). Particularly, sulfenamide-type vulcanization accelerators such as TBBS, CBS and DZ are desirably used because they provide an appropriate vulcanization rate. CBS is particularly desirable.

The amount of the vulcanization accelerator is desirably 0.5 parts by mass or more, and more desirably 0.7 parts by mass or more, per 100 parts by mass of the diene rubber. Also, the amount thereof is desirably 5 parts by mass or less, and more desirably 4 parts by mass or less, per 100 parts by mass of the diene rubber. If the amount thereof is less than 0.5 parts by mass, the rubber composition tends not to be sufficiently vulcanized and thereby the required rubber properties tend not to be achieved. If the amount thereof is more than 5 parts by mass, the rubber composition tends to be over-vulcanized.

The tread rubber composition of the present invention may be produced by a known method. For example, the tread rubber composition may be produced by kneading the above ingredients with a rubber kneader such as an open roll mill or a Banbury mixer, and then vulcanizing the mixture.

The tan δ peak temperature (Tg) of the tread rubber composition (after vulcanization) of the present invention is desirably −40° C. or lower, and more desirably −50° C. or lower. If the tan δ peak temperature (Tg) is higher than −40° C., temperature dependence may increase and performance on ice and snow may deteriorate. It is possible to set the value of tan δ peak temperature (Tg) to lower than −50° C. by selecting suitable kinds of components of the diene rubber to be used and adjusting their blending ratio. Here, the value of tan δ peak temperature (Tg) is determined by a measurement method described in EXAMPLES hereinbelow.

The hardness at 0° C. of the tread rubber composition (after vulcanization) of the present invention is desirably 64 or less, and more desirably 62 or less from the viewpoints of increasing grip (wet-skid resistance) on ice and snow and improving running stability on ice and snow. Also, the hardness at 0° C. thereof is desirably 40 or more, and more desirably 45 or more from the viewpoint of maintaining rigidity on roads that are not covered with snow. It is possible to set the value of hardness at 0° C. to less than 64 by selecting suitable kinds of components of the diene rubber to be used and adjusting their blending ratio. Here, the value of hardness at 0° C. is determined by a measurement method described in EXAMPLES hereinbelow.

The studless tire (pneumatic tire) of the present invention can be produced by a usual method with use of the above tread rubber composition. More specifically, the tread rubber composition of the present invention prepared by mixing the aforementioned ingredients is extruded and processed into a shape of tread at an unvulcanized stage, and then assembled with other tire components on a tire building machine and built up in a usual manner to obtain an unvulcanized tire. Then, the unvulcanized tire is subjected to heating and pressing in a vulcanizer to obtain the studless tire of the present invention.

The studless tire of the present invention is suitably used as studless tires for passenger vehicles, trucks and buses.

Examples

The present invention will be more specifically described based on examples, but the present invention is not limited to these examples.

In the following, respective chemical agents used in Examples and Comparative Examples are listed.

NR: RSS#1

Polybutadiene rubber (BR (1)): BR150L (produced by Ube Industries, Ltd.)

Polybutadiene rubber (BR (2)): modified butadiene rubber (produced by Sumitomo Chemical Co., Ltd., vinyl content: 15% by mass, modified by a compound represented by the formula (1) ($R^1$, $R^2$ and $R^3$=—$OCH_3$, $R^4$ and $R^5$=—$CH_2CH_3$, n=3))

Carbon black: SHOBLACK N339 (produced by Showa Cabot K.K., $N_2SA$: 90 $m^2/g$)

Silica: ULTRASIL VN3 (produced by Degussa AG, hydrous silica produced by a wet method, $N_2SA$: 175 $m^2/g$, average primary particle size: 15 nm)

Silane coupling agent TESPT: Si-69 (produced by Degussa AG, bis(3-triethoxysilylpropyl)tetrasulfide)

Naphthene oil: Process P-200 (produced by JAPAN ENERGY CORP.)

Antioxidant: OZONONE 6C (produced by Seiko Chemical Co., Ltd., N-(1,3-dimethylbutyl)-N'-phenyl-p-phenylenediamine)

Wax: SUNNOC WAX (produced by OUCHI SHINKO CHEMICAL INDUSTRIAL CO., LTD.)

Stearic acid: "KIRI" (produced by NOF Corp.)

Zinc oxide: Zinc oxide #2 (produced by MITSUI MINING & SMELTING CO., LTD.)

Sulfur: sulfur powder (produced by Karuizawa Iou K.K.)

Vulcanization accelerator CZ: NOCCELER CZ (produced by OUCHI SHINKO CHEMICAL INDUSTRIAL CO., LTD., N-cyclohexyl-2-benzothiazolylsulfenamide)

Examples 1 to 4 and Comparative Examples 1 to 4

(Preparation of Vulcanized Rubber Compositions (Vulcanized Rubber Sheets))

According to the respective formulations shown in Table 1, chemical agents other than sulfur and a vulcanization accelerator were kneaded by a Banbury mixer to provide a kneaded product. To the resulting kneaded product were added sulfur and a vulcanization accelerator, and then kneaded with an open roll mill to provide an unvulcanized rubber composition. Thereafter, the resulting unvulcanized rubber composition was press-vulcanized at 165° C. for 25 minutes to provide a vulcanized rubber composition (a vulcanized rubber sheet).

(Preparation of Studless Tires for Evaluation)

The obtained unvulcanized rubber compositions were individually molded into a tread shape, and then each of the molded rubber compositions was assembled with other tire components, followed by vulcanization. Thereby, studless tires for evaluations (tire size: 195/65R15) of Examples and Comparative Examples were produced.

The obtained vulcanized rubber compositions (vulcanized rubber sheets) and the obtained studless tires for evaluation were evaluated as follows. Table 1 illustrates the results.

(Tan δ Peak Temperature (Tg))

With respect to each of the vulcanized rubber compositions (the vulcanized rubber sheets) obtained in Examples and Comparative Examples, a distribution curve showing a temperature-tan δ relationship was constructed using a viscoelasticity spectrometer (produced by Iwamoto Seisakusho Co., Ltd.) under conditions of: 10 Hz in frequency; 10% in initial strain; ±0.25% in amplitude; and 2° C./min in rate of temperature rise. Then, the temperature at which tan δ showed the largest value in the distribution curve was determined as the tan δ peak temperature (Tg). The lower tan δ peak temperature (Tg) means the smaller increase in hardness and the more improvement of grip performance on ice.

(Hardness (0° C.))

With respect to each of the vulcanized rubber compositions (the vulcanized rubber sheets) obtained in Examples and Comparative Examples, its hardness at 0° C. was measured, by a type-A durometer, in accordance with JIS K 6253 "Rubber, vulcanized or thermoplastic—Determination of hardness". The lower hardness means the more excellent performance on ice and snow.

(Lambourn Abrasion Index)

With respect to each of the vulcanized rubber compositions (the vulcanized rubber sheets) obtained in Examples and Comparative Examples, the Lambourn abrasion loss was measured using a Lambourn abrasion tester (produced by Iwamoto Seisakusho Co., Ltd.) under conditions of: 40 m/min in surface rotation speed of a test piece (5 mm in thickness); 20% in slip ratio; 15 N in applied load; and 20 g/min in dropping rate of a dusting powder, in accordance with JIS K 6264-2 "Rubber, vulcanized or thermoplastic—Determination of abrasion resistance—Part 2: Testing methods". Thereafter, the volume loss was calculated from the measured Lambourn abrasion loss. The volume loss of Comparative Example 1 was regarded as 100, and the volume loss of each of the vulcanized rubber sheets was expressed as an index calculated by the following equation. The larger index value of Lambourn abrasion means the more excellent abrasion resistance.

(Lambourn abrasion index)=(Volume loss of Comparative Example 1)/(Volume loss of each of the compositions)×100

(Index of Braking Performance on Ice)

A FR car made in Japan (2000 cc) as a test vehicle was equipped with the studless tires for evaluation (tire size: 195/65R15) obtained in each of Examples and Comparative Examples, and braking distance from 30 km/h on ice was measured. The braking distance in Comparative Example 1 was regarded as a standard, and index of braking performance on ice was calculated by the following equation. The larger index value of braking performance on ice means the more excellent braking performance on ice. For smoothing the surface of the tires for evaluation, a 100-km break-in driving was performed before the test.

(Index of braking performance on ice)=(Braking distance in Comparative Example 1)/(Braking distance)×100

TABLE 1

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Formulation (part(s) by mass) | NR | 60 | 60 | 60 | 60 | 60 | 60 | 60 | 60 |
| | BR (1) (non-modified) | — | — | 20 | 20 | 40 | 40 | 35 | — |
| | BR (2) (modified) | 40 | 40 | 20 | 20 | — | — | 5 | 40 |
| | Carbon black | 5 | 25 | 5 | 25 | 5 | 25 | 5 | 45 |
| | Silica | 45 | 25 | 45 | 25 | 45 | 25 | 45 | 5 |
| | Silane coupling agent | 4.5 | 2.5 | 4.5 | 2.5 | 4.5 | 2.5 | 4.5 | 0.5 |
| | Naphthene oil | 30 | 30 | 30 | 30 | 30 | 30 | 30 | 30 |
| | Antioxidant | 2 | 2 | 2 | 2 | 2 | 2 | 2 | 2 |
| | Wax | 2 | 2 | 2 | 2 | 2 | 2 | 2 | 2 |
| | Stearic acid | 2 | 2 | 2 | 2 | 2 | 2 | 2 | 2 |
| | Zinc oxide | 3 | 3 | 3 | 3 | 3 | 3 | 3 | 3 |
| | Sulfur | 1.5 | 1.5 | 1.5 | 1.5 | 1.5 | 1.5 | 1.5 | 1.5 |
| | Vulcanization accelerator CZ | 1.0 | 1.0 | 1.0 | 1.0 | 1.0 | 1.0 | 1.0 | 1.0 |
| Tan δ peak temperature (Tg) | | −55 | −55 | −57 | −57 | −59 | −59 | −59 | −55 |
| Hardness (0° C.) | | 49 | 50 | 50 | 51 | 52 | 53 | 52 | 51 |
| Lambourn abrasion index | | 120 | 115 | 112 | 110 | 100 | 105 | 95 | 95 |
| Index of braking performance on ice | | 120 | 112 | 114 | 108 | 100 | 95 | 100 | 100 |

In respective Examples 1 to 4 in which the modified polybutadiene rubber (BR (2)) was blended, both the abrasion resistance and the braking performance on ice were more excellent than those in Comparative Examples 1 and 2 in which no modified polybutadiene rubber (BR (2)) was blended.

In Comparative Example 3 in which only a small amount of the modified polybutadiene rubber (BR (2)) was blended, the abrasion resistance and the braking performance on ice were inferior to those in Examples.

In Comparative Example 4, although the modified polybutadiene rubber (BR (2)) was blended in the same amount as that in Examples 1 and 2, silica was blended in a smaller amount; thus, the abrasion resistance and the braking performance on ice were inferior to those in Examples.

In Examples, the hardness at 0° C. was in the range of 49 to 51; that is, the rigidity was also maintained.

The invention claimed is:

1. A winter tire comprising a tread produced from a rubber composition, said rubber composition comprising:
   a diene rubber containing, in a total amount of 80% by mass or more, natural rubber and polybutadiene rubber;
   silica in an amount of 10 to 150 parts by mass per 100 parts by mass of the diene rubber; and
   carbon black in an amount of 3 to 50 parts by mass per 100 parts by mass of the diene rubber,
   the diene rubber containing 35 to 80% by mass of the natural rubber,
   the diene rubber containing 10% by mass or more of a polybutadiene rubber modified by a compound represented by the formula (1):

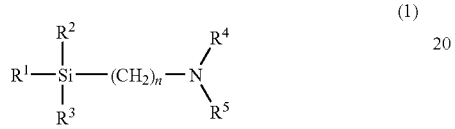

(1)

wherein $R^1$, $R^2$ and $R^3$ are the same or different and are independently an alkyl group, an alkoxy group, a silyloxy group, an acetal group, a carboxyl group, a mercapto group, or a derivative thereof;
$R^4$ and $R^5$ are the same or different and are independently a hydrogen atom or an alkyl group; and
n is an integer.

2. The winter tire according to claim 1, wherein the rubber composition has a tan δ peak temperature (Tg) of −40° C. or lower and a hardness at 0° C. of 64 or lower.

3. The winter tire according to claim 1, wherein a vinyl content in the modified polybutadiene rubber is 35% by mass or less.

4. The winter tire according to claim 1, wherein a nitrogen adsorption specific surface area of the carbon black is 70 to 110 m²/g.

5. The winter tire according to claim 1, wherein the rubber composition further contains N-cyclohexyl-2-benzothiazolylsulfenamide.

* * * * *